Nov. 18, 1930.  H. SYNCK  1,782,053
MANURE SPREADER
Original Filed March 14, 1924
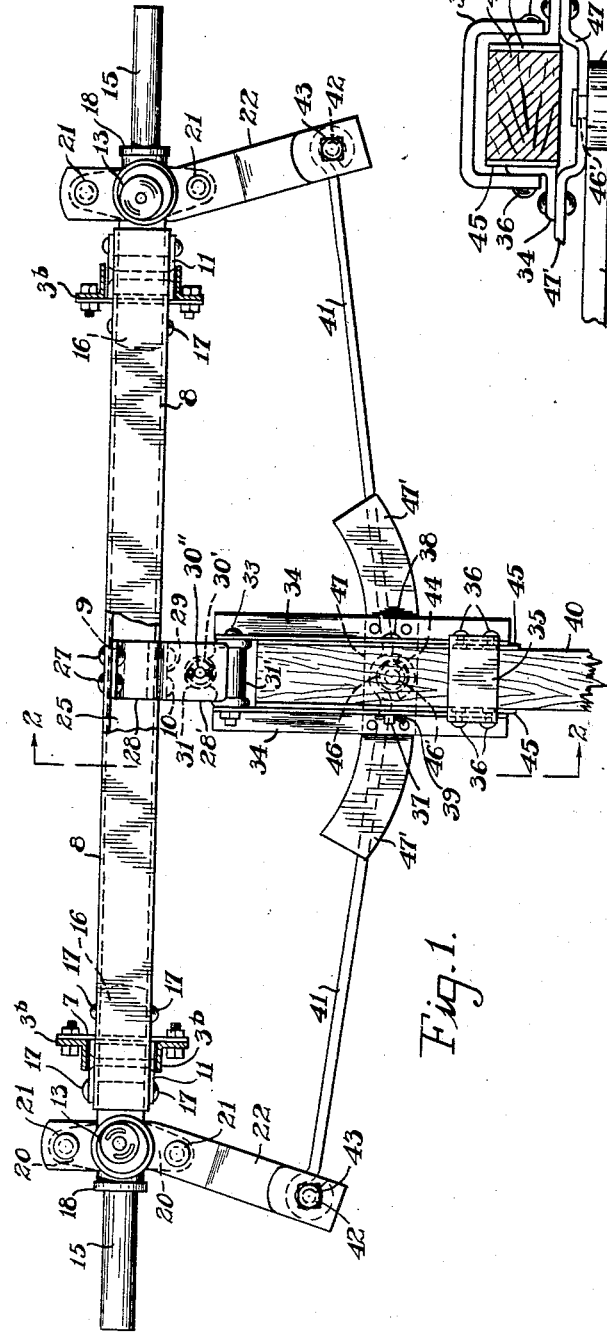
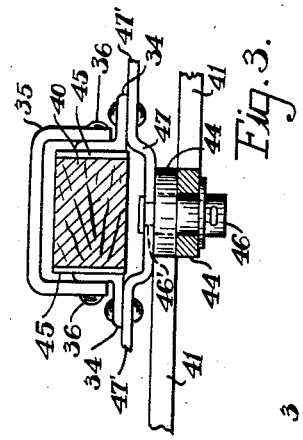
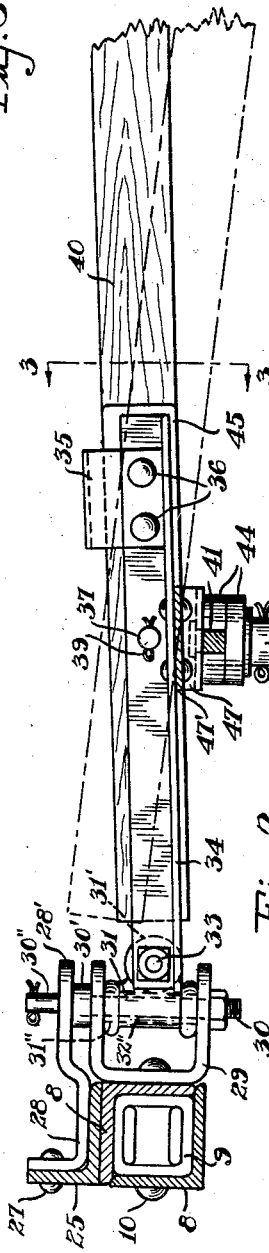
INVENTOR.
Henry Synck
BY Stanley Welch
ATTORNEYS.

Patented Nov. 18, 1930

1,782,053

UNITED STATES PATENT OFFICE

HENRY SYNCK, OF COLDWATER, OHIO, ASSIGNOR TO THE NEW IDEA SPREADER COMPANY, OF COLDWATER, OHIO, A CORPORATION OF OHIO

MANURE SPREADER

Original application filed March 14, 1924, Serial No. 699,385. Divided and this application filed March 19, 1927. Serial No. 176,780.

This invention relates to improvements in manure spreaders, it particularly relating to the draft appliances and steering devices for the front wheels, including an arrangement to limit the movement of these parts; this application being a division of my previous application, Serial No. 699,385, filed March 14, 1924.

The object of my invention is to provide simple and effective draft appliances and steering connections between the same and the front wheels in connection with simple and effective means for limiting the movement of the parts to prevent too close turning.

In the accompanying drawings:

Fig. 1 is a top plan view of the front axle, draft appliances and connections between the draft appliances and the spindles of the front wheels.

Fig. 2 is a section on the line 2—2 of Fig. 1.

Fig. 3 is a section on the line 3—3 of Fig. 2.

Referring to the drawings, the front axle is formed of two angle iron members 8, the edges of the horizontal and vertical webs of which are placed together so as to form a hollow structure which has a central filler member 9, this filler member and the two angle irons 8 being connected together at a mid point by a pair of rivets 10. Each of the ends of the axle projects through guides 3$^b$, depending from the bed in the manner explained in my previous application referred to, and secured to each side of the axle is a U-shaped plate 11, the vertical sides of which embrace the axle members so as to cooperate with the guide members 3$^b$ to guide the axle; the said plate 11 being secured to the axle member by the rivet 17.

The sleeve bearing 13 for each wheel spindle 15 has an integrally formed shank shown in dotted lines at 16, which is placed in the adjacent end of the axle and rigidly connected therewith by the said rivet 17, which passes through the vertical webs of the two axle members 8 so as to stiffen the axle structure and to provide for rigidly securing the bearing sleeve 13 thereto. A sleeve 18 at the juncture of the vertical and horizontal portions of each spindle is keyed to the spindle by a pin (not shown), and this sleeve 18 has oppositely projecting ears, shown in dotted lines at 20, in Fig. 1, to which are secured by rivets 21 a steering arm 22.

A bolster 25 of angle iron is shown in Figs. 1 and 2 and has its central portion resting upon the top of the central portion of the axle. Secured to the vertical web of the bolster by rivets 27 is the vertical web of a plate 28, a horizontal web of which projects forwardly and is off-set upwardly as indicated at 28′. Secured to the forward side of the axle by the rivets 10 is a U-shaped member 29, the horizontal webs of which receive a pivot bolt 30, the head 30′ of which is disposed between the upper horizontal portion of the member 29 and the off-set portion 28′; the bolt having an extension 30″, which extends loosely through the aperture in the part 28′, thus holding the bolster against endwise movement on the axle and also holding the bolster in alignment with the axle. Pivoted on this bolt is a sleeve 31 provided with a removable bushing, shown in dotted lines at 32″ in Fig. 2 which acts as a spacer. The sleeve 31 has on its forward side an integrally formed transversely extending boss 31′ provided with a transversely arranged opening to receive a bolt 33 upon which is secured as rigidly as possible the vertical webs of a pair of angle iron draft members 34 which extend forwardly and have their forward ends connected by an inverted U-shaped plate 35. The vertical portions of this U-shaped plate are connected by rivets 36 to the vertical webs of the members 34, with the horizontal portion thereof disposed a suitable distance above the upper edges of the vertical webs of the members 34. The vertical webs of the members 34 at a point slightly back of the U-shaped member 35 are apertured to receive a transversely arranged pin 37, one end of which has a head 38 and the other end provided with a cotter pin 39. The tongue 40 is provided with wear plates 45 at its sides and is inserted between the members 34 and is apertured to receive the pin 37 so that the tongue is connected to the members 34 on a horizontal pivot, the members 34 being in turn rigidly connected to the sleeve 31, which sleeve is connected to the axle and bolster on the vertical pivot 30. This arrangement permits the tongue to swing vertically on the pin 37 and laterally by reason of the pivot 30.

The steering arms 22 are connected to the draft members 34 through the links 41. The outer end of each of these links is formed with an eye to receive a bushing shown in dotted lines at 42 in Fig. 1, and through the bushing extends a bolt 43 carried by the arm 22, the free end of the arm being bent back in parallel relation with the main portion thereof so as to embrace the end of the link 41. The inner end of each of the links 41 is formed with an eye 44 (Fig. 3), to receive a hardened pin 46 carried by a bracket 47 which is riveted to the horizontal webs of the draft appliance members 34, as shown in Fig. 3. The upper end of the pin has a reduced neck 46′ which passes through an aperture in the bracket and is riveted down as shown, the pin being renewable as occasion demands. The bracket 47 has end extensions 47′, curved slightly in a rearward direction, which extensions act as stops by contact with the axle member 8 to prevent too close turning of the parts.

Having thus described my invention, I claim:

1. In a structure of the character described, an axle, wheel spindles pivotally connected with said axle, a pair of angle iron draft members pivotally connected with said axle by a vertical pivot, a tongue connected with said draft members, a metal bracket extending across and connected with said draft members, connections pivotally connected with said spindles and with said bracket, the ends of said bracket being extended beyond said draft members to cooperate with said axle to form stops.

2. In a structure of the character described, an axle, a pair of spaced-apart draft members pivotally connected with said axle by a vertical pivot only, a tongue extending between said draft members and pivotally connected directly therewith by a horizontal pivot carried by said draft members, a bracket rigidly connected to the under sides of said draft members, a wheel spindle swivelly connected with each end of said axle, and links pivotally connecting each wheel spindle with said bracket.

3. In a structure of the character described, an axle, a pair of spaced-apart angle iron draft members pivotally connected with said axle by a vertical pivot, a U-shaped member rigidly connecting the forward ends of said draft members together, a tongue projecting between said draft members and pivotally connected therewith by a horizontal pivot, a bracket rigidly connected to the under sides of said draft members, a wheel spindle swivelly connected to each end of said axle, and links pivotally connecting said spindle to said bracket.

4. In a structure of the character described, an axle, a pair of spaced-apart draft members pivotally connected with said axle by a vertical pivot, a tongue extending between said draft members and pivotally connected therewith by a horizontal pivot, a bracket rigidly connected to the under sides of said draft members, a wheel spindle swivelly connected with each end of said axle, and a link pivotally connecting each wheel spindle with said bracket, the ends of said bracket being extended beyond said draft members to cooperate with said axle to form stops.

In testimony whereof, I have hereunto set my hand this 3rd day of March, 1927.

HENRY SYNCK.